US008668888B2

(12) United States Patent
Auer et al.

(10) Patent No.: US 8,668,888 B2
(45) Date of Patent: Mar. 11, 2014

(54) ADSORBING AGENT CONTAINING TITANIUM AND IRON COMPOUNDS

(75) Inventors: Gerhard Auer, Krefeld (DE); Holger Eickhaus, Duisberg (DE); Horst Günnel, Kempen (DE); Werner Schuy, Tönisvorst (DE); Bernd Proft, Neukirchen-Vluyn (DE); Maurits Van Den Berg, Bochum (DE)

(73) Assignee: Sachtleben Pigment GmbH, Krefeld (DE)

( * ) Notice: Subject to any disclaimer, the term of this patent is extended or adjusted under 35 U.S.C. 154(b) by 0 days.

(21) Appl. No.: 13/698,067

(22) PCT Filed: May 17, 2011

(86) PCT No.: PCT/EP2011/058002
§ 371 (c)(1),
(2), (4) Date: Dec. 14, 2012

(87) PCT Pub. No.: WO2011/144637
PCT Pub. Date: Nov. 24, 2011

(65) Prior Publication Data
US 2013/0184149 A1 Jul. 18, 2013

(30) Foreign Application Priority Data

May 18, 2010 (DE) .......................... 10 2010 020 820

(51) Int. Cl.
| | | |
|---|---|---|
| *B01D 15/00* | (2006.01) | |
| *B01D 53/02* | (2006.01) | |
| *B01D 53/81* | (2006.01) | |
| *B01J 20/00* | (2006.01) | |

(52) U.S. Cl.
USPC ............... 423/210; 422/129; 95/116; 95/133; 95/135; 95/141; 96/154; 96/108; 210/702; 210/716; 210/723; 210/749; 210/908; 502/400; 502/406; 502/514

(58) Field of Classification Search
USPC .................... 423/210; 95/116, 133, 135, 141; 96/154, 108; 210/702, 716, 723, 749, 210/908; 502/400, 406, 514; 422/129
See application file for complete search history.

(56) References Cited

U.S. PATENT DOCUMENTS

| | | | |
|---|---|---|---|
| 4,071,347 A * | 1/1978 | Piccolo et al. .................... 71/31 |
| 6,923,917 B1 | 8/2005 | Hughes | |
| 7,811,360 B2 | 10/2010 | Schlegel et al. | |
| 2005/0152833 A1* | 7/2005 | Hughes ......................... 423/610 |
| 2006/0091078 A1* | 5/2006 | Meng et al. ................... 210/660 |
| 2010/0059447 A1* | 3/2010 | Martikainen ................. 210/688 |

FOREIGN PATENT DOCUMENTS

| | | |
|---|---|---|
| DE | 28 10 995 A1 | 9/1978 |
| EP | 1 443 121 A1 | 8/2004 |
| GB | 1 568 349 | 5/1980 |
| WO | 02/26631 A1 | 4/2002 |
| WO | 2006/087432 A1 | 8/2006 |

OTHER PUBLICATIONS

International application No. PCT/EP2011/058002, English translation of International Preliminary Report on Patentability, dated Jan. 21, 2013.
International Search Report, PCT International Application No. PCT/EP2011/058002, dated Oct. 18, 2011.
English Abstract of EP 1 443 121, 2004.

* cited by examiner

*Primary Examiner* — Timothy Vanoy
(74) *Attorney, Agent, or Firm* — Cahn & Samuels, LLP

(57) ABSTRACT

A composition containing titanium and iron compounds, in particular decomposition residue that accumulates as a production residue after the sulphate process during the production of titanium dioxide, is used as an adsorbing agent for inorganic and organic compounds, for example compounds containing phosphorus, arsenic, antimony, sulphur, selenium, tellurium, the cyano group or heavy metal. Toxic substances and pollutants may be removed from a fluid using the adsorbing agent.

26 Claims, No Drawings

ADSORBING AGENT CONTAINING TITANIUM AND IRON COMPOUNDS

This U.S. patent application is a national stage application of PCT/EP2011/058002 filed on 17 May 2011 and claims priority of German patent document 10 2010 020 820.5 filed on 18 May 2010, the entirety of which is incorporated herein by reference.

BACKGROUND OF INVENTION

The present invention concerns the use of a composition containing titanium and iron compounds, in particular decomposition residue which occurs as a production residue in the production of titanium dioxide using the sulphate process, as an adsorbing agent for inorganic and organic compounds, for example compounds containing phosphorus, arsenic, antimony, sulphur, selenium, tellurium, cyano and heavy metal, and methods of removing toxic substances and pollutants from a fluid using said adsorbing agent, methods of producing the adsorbing agent and the adsorbing agent which can be obtained by means of those methods.

Arsenic is a constituent part of our environment, that disseminated predominantly from natural sources and is subject to a perpetual biogeochemical cycle. Thus the greatest occurrence of arsenic in the earth occurs bound in sulphide form in the earth's crust. Arsenic has many interesting properties. Thus the toxic element occurs in many different forms, both organic and also inorganic. On a worldwide basis around 200 millions of people are exposed to arsenic-contaminated water. Tumour diseases such as for example skin and lung cancer can be the consequence of increased absorption of arsenic. Arsenic exhibits its carcinogenic action in particular after chronic absorption of small amounts over many years.

Earlier arsenic was used as a fertiliser so that many areas of ground are still contaminated. Arsenic is a problem in particular in Asiatic countries. The main nutrients there include rice which grows in water. If that water is heavily arsenic-bearing then the plant accumulates the toxic substance. Whereas on average only 25 grams of rice per day are consumed in Europe where the arsenic content in drinking water is limited to ten micrograms per liter, in Asia the consumption is 300 grams. Here levels of concentration of 800 micrograms of arsenic per kilo have already been found rice. In algae for example the arsenic is increased in content by the factor of 100000 in comparison with sea water. Thus 180 milligrams of organic arsenic per kilogram of algae (dry weight) have already been found. The plants which are extolled as a miracle health cure from the sea can also contain up to 40 milligrams of inorganic arsenic per kilo of algae dry weight. Unlike the situation for drinking water there is no limit value in Germany for foodstuffs so that those algae may be freely sold.

One possible way of reducing the introduction of arsenic into the food chain involves eliminating the arsenic from drinking water or water which is used for agriculture or livestock breeding or at least reducing the concentration thereof.

Iron oxides and hydroxides have a high affinity for arsenic and are therefore used as adsorbing agents. For example Schlegel et al. describe a granular material comprising iron oxide and hydroxide with a high specific surface area (50 to >200 m$^2$/g) which is highly suitable for the adsorption of heavy metals from fluid flows (A. Schlegel et al., European patent EP 1582505 B1). Adsorbing agents produced specifically for that application are offered for example by Lanxess under the name Bayoxide E33 (with BET surface areas in the range of between 120 and 250 m$^2$/g) and Evers under the name Everzit As (with a BET surface area of >300 m$^2$g).

US patent No 2006/0144793 describes titanium dioxide nanoparticles (<100 Å), whose surface is occupied by hydroxyl groups, and describes that the adsorption of heavy metals takes place on hydroxyl groups and therefore the hydroxyl groups are absolutely necessary for adsorption.

Generally a large effective surface area is an aspect of significant advantage for adsorption processes. It is for example possible to produce an effective TiO$_2$-based adsorbing agent with a large surface area from titanium compounds (for example chlorides or sulphates) by means of hydrolysis in the presence of a porous substrate (US No 2003/068683).

In addition a finely divided titanium dioxide from Dow Chemicals (Adsorbsia GTO with a BET surface area in the range of between 200 and 300 m$^2$/g) was proposed for the adsorption of arsenic.

Graver Technologies offers a granulated adsorbing agent (granule size 250-1190 μm) which for the main part contains titanium dioxide but also titanium hydroxide, but no foreign elements in proportions worth mentioning. That product is used for adsorption of heavy metals. According Graver Technologies both the good adsorption kinetics and also the adsorption capacity are advantages of titanium-based adsorbing agents.

Basically it is assumed on the part of the persons skilled in the art that the adsorption action is correspondingly better, in proportion to the adsorbing agent being more finely divided or the BET surface area being larger or the concentration of hydroxyl groups being higher.

A disadvantage with the existing adsorbing agents is the complicated production procedure and the high costs linked thereto for the adsorbing agent, especially as in practice very large amounts of adsorbing agent are frequently required, for example for purifying ground water.

Therefore the object of the present invention is to find an alternative, inexpensive and highly effective adsorbing agent which can replace the known adsorbing agents and which overcomes the existing disadvantages.

SUMMARY OF INVENTION

According to the invention that object is attained by the use of a composition containing titanium and iron compounds as an adsorbing agent for inorganic and/or organic compounds, in particular toxic substances and/or pollutants, including phosphates and/or compounds containing arsenic, antimony, sulphur, selenium, tellurium, cyano and/or heavy metal.

From investigations on the part of the inventors it has surprisingly turned out that, in particular for the adsorption of metals on the adsorbing agent, it is particularly advantageous if the adsorbing agent used is decomposition residue which occurs as a by-product in the production of titanium dioxide using the sulphate process. The inventors assume, without being tied down to this hypothesis, that the use of decomposition residue is particularly advantageous as it is a chemically heterogeneous material which contains both titanium (Ti) and also iron (Fe) in oxide forms.

The heavy metal-bearing compounds can involve in particular lead, mercury, cadmium, uranium, nickel, chromium, copper, zinc and/or tin-bearing compounds.

In various embodiments of the invention the compound to be adsorbed is an arsenic- or lead-bearing compound, preferably an arsenic-bearing compound.

In connection with the present invention the expression "-bearing compound" relates to a compound which contains the aforementioned element in elementary, bound, ionic and/or complexed form. The expression includes salts, complexes, crystals and all other forms of the corresponding element, that is to say also the elementary form. The corresponding compound can occur in the form of a solid, in fluid form, including a dissolved form, or as a gas.

DETAILED DESCRIPTION OF INVENTION

In an embodiment of the invention the adsorbing agent used contains at least 5% by weight of titanium (Ti) and at least 2% by weight of iron (Fe), preferably at least 10% by weight of Ti and at least 3.5% by weight of Fe, particularly preferably at least 30% by weight of Ti and at least 5% by weight of Fe with respect to the total weight of the adsorbing agent.

In an embodiment the adsorbing agent contains titanium dioxide ($TiO_2$) and/or iron oxide, preferably at least 8% by weight of $TiO_2$ and/or at least 3% by weight of $Fe_2O_3$, still more preferably at least 16% by weight of $TiO_2$ and/or at least 5% by weight of $Fe_2O_3$.

In an embodiment of the invention the adsorbing agent contains decomposition residue which occurs as an insoluble residue in the production of titanium dioxide using the sulphate process for the production or manufacture of titanium dioxide in accordance with the state of the art (see for example Industrial Inorganic Pigments (editor G. Buxbaum, Wiley-VCH, Weinheim, 3rd edition 2005, pages 59 to 61) or Ullmann's Enzyklopädie der Technischen Chemi, 4th edition, volume 15 (1979)) and is separated from the so-called black solution. In that case the adsorbing agent can contain at least 20% by weight, preferably at least 50% by weight, still more preferably at least 75% by weight of decomposition residue relative to the weight of the adsorbing agent or can even completely consist of decomposition residue. If the adsorption agent is a mixture of decomposition residue with another adsorbing agent the adsorbing agent can contain at least 20% by weight, preferably at least 50% by weight of decomposition residue together with at least one further adsorbing agent. The at least one further adsorbing agent can involve known adsorbing agents like iron oxides or titanium dioxide, in particular in pure and finely divided form (BET>200 $m^2$/g).

In the production of titanium dioxide using the sulphate process firstly the titanium-bearing ore, for example ilmenite or titanium slag, is crushed and then decomposed with sulphuric acid. That results in a solids-bearing solution or suspension, the so-called solids-bearing black solution, in which the titanium is present in dissolved form as titanyl sulphate.

To be able to further process the solids-bearing black solution it is necessary for that black solution to be prepared by solids separation to afford a solids-free solution or decomposition solution, the so-called solids-free black solution. In that case the solid particles in the black solution, which usually involve residues of the titanium-bearing starting material, that is to say non-decomposed ore, are removed. That is necessary to obtain titanium dioxide in an adequate state of purity in the subsequent further method steps and stages.

Solids separation can be effected for example by centrifuging, sedimentation or by filtration. In general this solids separation operation is effected by vacuum filtering or filter pressing, for example by means of a vacuum rotary filter or a chamber or diaphragm filter press. The solid matter in the solids-bearing black solution is frequently pre-concentrated prior to filtration in a thickener.

Further steps which possibly serve for processing the decomposition residue obtained by solids separation are one or more washing steps which can be implemented with water or dilute sulphuric acid, one or more neutralisation steps (for example by means of NaOH, $CaCO_3$, CaO, cement or $NH_3$), one or more drying steps or one or more grinding steps.

The decomposition residue occurring in titanium dioxide production by means of the sulphate process is present in a constant quality on a large-scale basis and is inexpensively available as it usually has to be disposed of.

The product obtained in that way is referred to hereinafter as the "decomposition residue" or "titanium concentrate".

In an embodiment of the invention the adsorbing agent contains 1 to 20% by weight of silicon, preferably 5 to 15% by weight of silicon, relative to the total weight of adsorbing agent.

In various embodiments of the invention the adsorbing agent is distinguished in that it has a BET surface area of between 1 and 350 $m^2$/g, preferably between 4 and 150 $m^2$/g, particularly preferably between 6 and 40 $m^2$/g.

In further embodiments of the invention the adsorbing agent has a crystallite size, measured at the rutile reflex, of more than 10 nm, preferably >20 nm.

In an embodiment of the invention the decomposition residue which substantially contains non-decomposed ore, filter additives and possibly other residues, has a high content of titanium dioxide of from 10 to 80% by weight, preferably from 25 to 70% by weight, still more preferably from 40 to 60% by weight, relative to the solids proportion. In that case the titanium dioxide can be present predominantly, that is to say >50%, preferably >75%, in the form of the rutile modification or as iron titanate. In such embodiments the proportion of anatase can be less than 50%, preferably less than 25%. In various embodiments the ratio of the intensities, determined by powder diffractometry, of the (101)-reflection line of anatase (at approximately 25.28° 2θ) and the (110)-reflection line of rutile (at approximately 27.45° 2θ) can be less than 1, preferably less than 0.40

In certain embodiments of the invention the decomposition residue is washed with dilute sulphuric acid and/or water prior to use as a component of the adsorbing agent. In addition the decomposition residue can be entirely or partially neutralised prior to use with a base or by further washing with water.

In certain embodiments of the invention it may be advantageous to dry the decomposition residue, for example by blowing dry with air or heated air.

In addition the drying operation can also be implemented with any method and assembly known to the man skilled in the art, for example in a drying compartment, with a belt drier, a spray drier or a spinflash drier.

Optionally the dried decomposition residue can be deagglomerated or ground to a fine powder to improve processability, for example by means of a pinned disc mill, a rolling mill, a Bauermeister mill or other assemblies known to the man skilled in the art.

The decomposition residue however can also be used in the form of a filter cake. That makes it possible to avoid expensive drying of the decomposition residue.

The titanium-bearing starting material, from which the decomposition residue remains after the decomposition operation in the form of a solids component, is usually ilmenite or titanium slag or a mixture thereof.

Further steps which optionally serve to process the decomposition residue obtained by the solids separation operation are one or more washing steps which can be carried out with water or dilute sulphuric acid, one or more drying steps, one or more neutralisation steps which can optionally include the addition of neutralisation agent, and one or more grinding and/or granulation steps.

In an embodiment of the invention the adsorbing agent can be used together with a further adsorbing agent, in particular an iron oxide-bearing material.

In various embodiments of the invention the adsorbing agent is used at a pH-value of <7, for example <5.5 or <4. A low pH-value can improve in particular the adsorption of arsenic-bearing compounds, for example $As^{5+}$, from aqueous solutions.

In an embodiment of the invention the amount of adsorbing agent can be so selected that the mass ratio of adsorbing agent to the substance to be adsorbed is from 10 to 10000, preferably from 20 to 500, particularly preferably from 40 to 100.

In the use according to the invention the inorganic and/or organic compounds can be removed from a fluid, for example a gas or a liquid, such as for example water, in particular waste water or sewage or ground water. In that case the substances to be removed can be present in dissolved form, for example in aqueous solution.

In a further aspect therefore the invention also concerns a method of removing inorganic and/or organic compounds, in particular pollutants and/or toxic substances, from a fluid, wherein the method includes bringing the fluid into contact with an adsorbing agent, characterised in that the adsorbing agent is a composition which contains titanium and iron compounds, as was described hereinbefore in connection with the use according to the invention.

The adsorbing agents used in this method are therefore the same which were described hereinbefore in connection with the use according to the invention.

In an embodiment of the method the fluid is a gas, for example a waste gas, or a liquid, such as for example water, in particular waste water or ground water. The waste gases can be for example waste gases from combustion processes or waste gases occurring in chemical processes. The waste waters can involve industrial waste waters or domestic waste waters.

In an embodiment of the method the fluid is the starting material (also referred to in English as the feed) for so-called fluid catalytic cracking (FCC). That method is used for example to convert heavy petroleum fractions into valuable olefins (ethene, propene, butene), cat cracker benzene, light cycle oil (LCO) and heavy cycle oil components (heavy cycle oil, HCO, and slurry). In that process impurities of in particular nickel and vanadium but also for example copper or other metallic impurities are particularly damaging to the catalyst used. The adsorbing agent can be used to remove those impurities directly from the feed. A further possible option is the addition of adsorbing agent to the reaction mixture. As a third possible option the adsorbing agent can be added to the catalyst, as a catalyst component. In that case the fluid is for example petroleum or petroleum fractions.

The pollutants and/or toxic substances which are adsorbed from the fluid by the method according to the invention can be phosphates or compounds containing arsenic, antimony, sulphur, selenium, tellurium, cyano and heavy metal. Heavy metals by way of example are those mentioned hereinbefore. Preferably the adsorbed substances are arsenic-bearing and/or lead-bearing compounds.

The operation of bringing the adsorbing agent into contact with the fluid can be effected in known manner. In particular the adsorbing agent can be brought into contact with the fluid in the form of a solid, for example in granulate form. In that case the adsorbing agent can be applied to a carrier or can be used in the form of a cartridge or cassette through which the fluid flows.

In a further aspect the invention also concerns a method of producing an adsorbing agent which contains titanium and iron compounds, wherein the method includes:

(i) decomposing a titanium- and iron-bearing starting material with sulphuric acid to obtain a solids-bearing decomposition solution, (ii) separating off the solids contained in the decomposition solution to obtain a decomposition residue and a substantially solids-free decomposition solution, (iii) drying and grinding or granulating the decomposition residue to obtain an adsorbing agent.

The invention also concerns method of producing an adsorbing agent which contains titanium and iron compounds, wherein the method includes:

(i) decomposing a titanium- and iron-bearing starting material with sulphuric acid to obtain a solids-bearing decomposition solution, (ii) separating off the solids contained in the decomposition solution to obtain a decomposition residue and a substantially solids-free decomposition solution, (iii) completely or partially neutralising the decomposition residue, (iv) optionally washing the neutralised decomposition residue for the removal of sulphate salts, and (v) optionally drying and/or granulating the decomposition residue to obtain an adsorbing agent.

The titanium- and iron-bearing starting material may be titanium-bearing ores such as for example ilmenite or titanium slag.

The decomposition and/or separation step can be carried out similarly to the corresponding steps in the known sulphate method for the production of titanium dioxide.

Preferably the decomposition residue is entirely or partially neutralised. All neutralisation agents with which the man skilled in the art is familiar are suitable for that purpose, but particularly preferably use is made of those neutralisation agents which either form sulphates which can be well washed out (for example alkali, ammonia, Mg) or difficultly soluble sulphates (for example Ba). In that way the adsorbing agent according to the invention contains little salts which in use pass into the medium to be purified. The latter is the case in particular when using Ca-bearing neutralisation agents.

It may also be advantageous if compounds containing iron ions are added to the decomposition residue prior to the neutralisation step. In that way finely divided iron hydroxides which boost the adsorption action are formed in the neutralisation step. Preferably iron salts are added in dissolved form, particularly preferably in the form of iron(II)sulphate and/or iron(III)sulphate.

The proportion of soluble iron in the adsorbing agent with the addition of iron(II)sulphate or iron(III)sulphate is preferably >0.5% by weight, more preferably >1.0% by weight, particularly preferably >2% by weight, in each case relative to the amount of adsorbing agent.

The proportion of soluble iron in the adsorbing agent can also be related to the amount of dissolved titanium: the mass ratio of soluble iron to soluble titanium in the adsorbing agent to which iron(II)sulphate or iron(III)sulphate is added is >0.8, preferably >1.5 particularly preferably >3.

The operation of determining the soluble iron and titanium is effected in such a way that, upon suspension of the adsorbing agent in ten times the amount of a 30% sulphuric acid, after agitation for one hour and then separation of the undissolved components, the iron and titanium concentration in the fluid phase is determined.

Drying of the decomposition residue can be effected for example by blowing dry with air or heated air. In addition the drying operation can also be effected with any method and assembly known to the man skilled in the art, for example in a drying compartment, with a belt drier, a spray drier or a spinflash drier.

The dried decomposition residue can be deagglomerated or ground to a fine powder, for example by means of a pinned disc mill, a rolling mill, a Bauermeister mill or other assemblies known to the man skilled in the art.

The dried decomposition residue can be pressed to form granules of any suitable dimensions, for example by means of a dual rolling press, a tablet press, a screw press or other assemblies known to the man skilled in the art.

For granulation of the decomposition residue the latter can also be mixed with suitable inorganic additives such as for example $SiO_2$, hydraulically reacting Ca-compounds like cement or CaO, polyphosphates and so forth and/or organic additives like polyvinyl acetate, cellulose and so forth, optionally with the addition of water. Thereafter the material obtained can be dried and for example made into pieces by passing through a sieve of suitable mesh width.

Granulation of the decomposition residue can be effected chemically (by means of additives) or physically (by means of pressing force) or by a combination of the two procedures (by means of additives and by means of pressing force).

In still a further aspect the invention concerns an adsorbing agent which can be obtained by the method according to the invention. Preferably the adsorbing agent is present in granulated form.

The adsorbing agent can be applied to a suitable substance, for example polyethylene, or alkyd resins, or PTFE and so forth. That carrier material can be applied to a metal surface, depending on the respective application involved, so that the carrier material operates as a binding layer between that metal surface and the adsorbing agent. On the other hand it is also possible to produce granulates comprising carrier substance and adsorbent agent.

Finally the invention also concerns an apparatus which contains the adsorbing agent according to the invention. This can involve for example a solid carrier to which the adsorbing agent is applied or in which the adsorbing agent is enclosed. An example of such apparatus is a container such as for example a cartridge or cassette which contains the adsorbing agent but also an apparatus having plates or sheets to which the adsorbing agent is applied.

The adsorbing agent according to the invention can possibly be regenerated after use. For example regeneration of the charged adsorbing agent can be effected by washing with alkaline or acid solutions.

Alternatively the adsorbing agent can be disposed of after use. For example the charged adsorbing agent can be vitrified, fixedly bound into a cement-bearing matrix or provided with a water-tight, inorganic or organic coating and thus prepared for disposal.

Further embodiments of the invention are contained in the claims and the examples. The following examples serve to illustrate the invention, without the invention being limited to those specific embodiments.

EXAMPLES

Example 1

The solids-bearing decomposition solution obtained upon decomposition of a titanium-bearing slag with sulphuric acid was transferred into a thickener. From the underflow of the thickener the decomposition residue was separated off in a filter press, neutralised with sodium hydroxide, filtered again and then spray-dried.

The product obtained was of the following composition:
Spray-Dried Decomposition Residue

| | | |
|---|---|---|
| Residual moisture IR Tr.30' 105° C. | [%] | 0.45 |
| Residual moisture IR Tr.2d 30" 160° C. | [%] | 0.51 |
| TGV MS-S 2' US-sonotrode | D[v, 0.1] | 1.4 |
| 200 W [μm] | D[v, 0.5] | 16.3 |
| | D[v, 0.9] | 56.6 |
| | D[v, 0.98] | 89.6 |
| | D[4.3] | 23.5 |
| DIN-pH | | 8.5 |
| Bulk weight | [g/cm$^3$] | 0.96 |
| BET | [m$^2$/g] | 10.6 |
| RFA [%] | Ti | 28.9 |
| | Si | 12.3 |
| | Fe | 5.4 |
| | Ca | 2.6 |
| | Na | 2.5 |
| | Al | 1.7 |
| | Mg | 1.4 |
| | S | 1.2 |
| | Mn | 0.8 |
| | K | 0.3 |
| | Zr | 0.2 |
| | Nb | 0.1 |

Example 2

100 ml of heavy metal solution produced by dissolving a heavy metal salt in water was set to the desired pH-value with nitric acid or caustic soda. That solution was provided in a glass beaker and the adsorbing agent added with agitation. The pH-value was set to the desired pH-value with nitric acid or caustic soda and possibly corrected after 5 minutes. After a total agitation time of 30 minutes at room temperature (20-25° C.) the solution was allowed to sediment for a short time and the supernatant solution was filtered clear by way of a 0.45 μm membrane filter. The starting solution and the filtrate were analysed.

The following heavy metals, levels of concentration, pH-values and adsorbing agent were used:

A: Lead ($Pb^{2+}$) 13 mg/l, pH 2, adsorbing agent: A-K-1 (finely divided anatase from crenox GmbH with a BET surface area of about 90 m$^2$/g), ratio: 13 mg lead to 1 g adsorber mass;

B: Lead ($Pb^{2+}$) 13 mg/l, pH 2, adsorbing agent: decomposition residue according to Example 1, ratio: 13 mg lead to 1 g adsorber mass;

C: Lead ($Pb^{2+}$) 13 mg/l, pH 3, adsorbing agent: A-K-1 (finely divided anatase from crenox GmbH with a BET surface area of about 90 m$^2$/g), ratio: 13 mg lead to 1 g adsorber mass;

D: Lead ($Pb^{2+}$) 13 mg/l, pH 3, adsorbing agent: decomposition residue according to Example 1, ratio: 13 mg lead to 1 g adsorber mass;

E: Arsenic ($As^{5+}$) 0.058 mg/l, pH 3.2, adsorbing agent: A-K-1 (finely divided anatase from crenox GmbH with a BET surface area of about 90 m$^2$/g), ratio: 0.058 mg arsenic to 1 g adsorber mass;

F: Arsenic ($As^{5+}$) 0.058 mg/l, pH 3.2, adsorbing agent: decomposition residue according to Example 1, ratio: 0.058 mg arsenic to 1 g adsorber mass;

G: Arsenic ($As^{5+}$) 0.058 mg/l, pH 3.2, adsorbing agent: TH 8600 (=commercially available product from crenox GmbH), ratio: 0.058 mg arsenic to 1 g adsorber mass;

H: Arsenic ($As^{5+}$) 0.058 mg/l, pH 3.2, adsorbing agent: Bayferrox 920 (=commercially available product from Lanxess Deutschland GmbH), ratio: 0.058 mg arsenic to 1 g adsorber mass;

I: Arsenic ($As^{5+}$) 11 mg/l, pH 3.2, adsorbing agent: decomposition residue according to Example 5, ratio: 11 mg arsenic to 1 g adsorber mass;

J: Arsenic ($As^{5+}$) 11 mg/l, pH 3.2, adsorbing agent: TH 8600 (=commercially available product from crenox GmbH), ratio: 11 mg arsenic to 1 g adsorber mass.

The products obtained are shown in Table 1:
(Mass % relates to Pb and As respectively. Charge means: amount of metal in mg relative to the amount of adsorbing agent in g).

TABLE 1

| Example | After adsorption: | | |
|---|---|---|---|
| | Mass % in sol. | Mass % adsorbed | Charge mg/g |
| A | 92 | 8 | 0.9 |
| B | 92 | 8 | 1 |
| C | 72 | 28 | 3.5 |
| D | 68 | 32 | 4.2 |
| E | 57 | 43 | 0.025 |
| F | 12 | 88 | 0.051 |
| G | 2 | 98 | 0.057 |
| H | 28 | 72 | 0.042 |
| I | 72 | 28 | 3.1 |
| J | 1 | 99 | 10.9 |

Example 3

Production of a Granulate 1 from Decomposition Residue:
143 g of filter cake of an acid-washed titanium concentrate (=filter cake, washed with 10% sulphuric acid, of the decomposition residue from process step ii) as described on page 9) was kneaded in a mixer, mixed with 6 g of calcium oxide and 69.5 g of distilled water and homogenised so that a paste-like material was the result. That was dried at a temperature of 120° C. and the drying residue made into pieces by passing it by way of a sieve involving a mesh width of 3 mm. The fine grain proportion <0.5 mm was discarded.

Production of a Granulate 2 from Decomposition Residue:
143 g of filter cake of an acid-washed titanium concentrate (=filter cake, washed with 10% sulphuric acid, of the decomposition residue from process step ii) as described on page 9) was kneaded in a mixer, mixed with 50 g of dilute acid and 11.5 g of a 50% sodium polyphosphate solution and homogenised so that a paste-like material was the result. That was dried at a temperature of 120° C. and the drying residue made into pieces by passing it by way of a sieve involving a mesh width of 3 mm. The fine grain proportion <0.5 mm was discarded.

The results obtained with granulated adsorbing agent are shown in Table 2.

TABLE 2

| Example | BET | Pollutant | Ratio: mg As/g adsorber mass | pH | c [mg/l] before adsorption | c [mg/l] after adsorption | Charge: mg As/g adsorbing agent | Masses % adsorbed |
|---|---|---|---|---|---|---|---|---|
| Granulate 1 | 14 m²/g | As 5+ | 104 | 3.0 | 104 | 100 | 4 | 4 |
| | | As 5+ | 10.4 | 3.0 | 104 | 44 | 6 | 58 |
| | | As 5+ | 107 | 8.0 | 107 | 100 | 7 | 7 |
| | | As 5+ | 10.7 | 8.0 | 107 | 42 | 7 | 61 |
| Granulate 2 | 6 m²/g | As 5+ | 104 | 3.0 | 104 | 93 | 11 | 11 |
| | | As 5+ | 10.4 | 3.0 | 104 | 1.0 | 10 | 99 |
| | | As 5+ | 107 | 8.0 | 107 | 83 | 22 | 22 |
| | | As 5+ | 10.7 | 8.0 | 107 | 0.3 | 11 | 100 |

Example 4

Various adsorbing agents were compared in regard to their effectiveness. The results are shown in Table 3.1 (high concentration of dissolved arsenic) and 3.2 (low concentration of dissolved arsenic).

Column 3 (masses % adsorbed) describes in that respect the proportion of the initially dissolved metals which were held fast on the adsorbing agent.

TABLE 3.1

(high concentration of dissolved arsenic)

| Adsorbing agent: | Element | Mass % adsorbed | pH | c [mg/l] before adsorption | c [mg/l] after adsorption |
|---|---|---|---|---|---|
| Titanium concentrate | As 5+ | 28 | 3 | 11 | 7.9 |
| TH | As 5+ | 99 | 3 | 11 | 0.10 |
| Titanium concentrate | As 5+ | 6 | 5 | 10 | 9.4 |
| TH | As 5+ | >99 | 5 | 10 | <0.10 |
| Titanium concentrate | As 5+ | 9 | 7 | 11 | 10 |
| TH | As 5+ | 96 | 7 | 11 | 0.45 |
| Titanium concentrate | As 5+ | 0 | 8 | 11 | 11 |
| TH | As 5+ | 91 | 8 | 11 | 1.0 |

In that respect it is shown that the effectiveness (column 3) of titanium concentrate is correspondingly better, the lower the pH-value of the solution. For titanium hydrate (TH) in contrast the effectiveness in the entire pH-range investigated is approximately equally good.

TABLE 3.2

(low concentration of dissolved arsenic)

| Adsorbing agent: | Element | Mass % adsorbed | pH | c [mg/l] before adsorption | c [mg/l] after adsorption |
|---|---|---|---|---|---|
| A-K-1 | As 5+ | 43 | 3 | 0.058 | 0.033 |
| Titanium concentrate | As 5+ | 88 | 3 | 0.058 | 0.007 |
| TH | As 5+ | 98 | 3 | 0.058 | 0.001 |
| Lanxess iron oxide Bayferrox 920 | As 5+ | 72 | 3 | 0.058 | 0.016 |
| A-K-1 | As 5+ | 94 | 8 | 0.017 | 0.001 |
| Titanium concentrate | As 5+ | 18 | 8 | 0.017 | 0.014 |
| TH | As 5+ | >94 | 8 | 0.017 | <0.001 |
| Lanxess iron oxide Bayferrox 920 | As 5+ | 88 | 8 | 0.017 | 0.002 |

In that respect it is shown that the effectiveness (column 3) of the titanium concentrate according to the invention is very good at a pH-value of 3 and comparable to the partially substantially finer comparative products (BET surface areas of titanium concentrate=about 10 m$^2$/g, A-K-1=about 90 m$^2$/g, titanium hydrate 8600=>300 m$^2$/g, Bayferrox 920=about 15 m$^2$/g).

Example 5

Production of a Granulate 3 from Decomposition Residue:

The decomposition residue is mixed with a binding agent and homogenised to a paste in a kneading machine (Krups-3-Mix), dried and made into pieces.

Abrasion Test:

10 g of the granulate to be investigated of the grain size fraction 0.5-4.0 mm is weighed into a cylindrical 250 ml glass flask, mixed with 150 ml of DI-water and rotated at about 250 rpm at room temperature on a shaker machine over a period of 30 minutes.

The fine component <0.1 mm of the suspension was then isolated by means of a sieve, dried and weighed.

Abrasion value x(%)=[100×weighing-out fine component (g)/weighing-in granulate(g)]

TABLE 3.3

(Abrasion values with various binding agents)

| Binding agent | Trade name | Proportion % by wt | Abrasion value % |
|---|---|---|---|
| Polyvinyl acetate | Mowilith | 20 | 8.22 |
| Portland cement | ISTRA 40 | 20 | 10.7 |
| Portland blast furnace cement | CEMII/A | 20 | 3.95 |
| Calcium oxide | | 20 | 9.72 |
| Calcium oxide + Portland cement | | 7.3 + 10 | 5.99 |

Example 6

Production of a Granulate 4 from Decomposition Residue:

8.8 g of the decomposition residue is compressed to a homogenous pressing of 3 cm in diameter with a laboratory pressing tool under a pressing pressure of 7.4 kN/cm$^2$. The pressing is mixed with 150 ml of DI-water in a cylindrical 250 ml glass flask and caused to rotate at about 250 rpm at room temperature on a shaker machine over a period of 30 minutes.

The fine component <0.1 mm of the suspension was then isolated by means of a sieve, dried and weighed.

Abrasion value x(%)=[100×weighing-out fine component (g)/weighing-in pressing(g)]

A value of 1.4% by weight was found.

The invention claimed is:

1. A method, comprising:
   contacting inorganic and/or organic compounds with an adsorbing agent comprising a decomposition residue which occurs as an insoluble residue in the production of titanium dioxide using the sulphate method and which contains titanium and iron compounds, and
   adsorbing the inorganic and/or organic compounds.

2. A method according to claim 1, wherein the inorganic and/or organic compounds involve phosphates and/or compounds containing arsenic, antimony, sulphur, selenium, tellurium, cyano and/or heavy metal.

3. A method according to claim 2, wherein the heavy metal-bearing compounds are compounds containing lead, mercury, cadmium, uranium, nickel, chromium, copper, zinc and/or tin.

4. A method according to claim 1, wherein the adsorbing agent contains at least 5% by weight of titanium and at least 2% by weight of iron with respect to the total weight of the adsorbing agent.

5. A method according to claim 1, wherein the adsorbing agent contains 1 to 20% by weight of silicon by weight of silicon with respect to the total weight of the adsorbing agent.

6. A method according to claim 1, wherein the adsorbing agent has a BET surface area of between 1 and 350 m$^2$/g.

7. A method according to claim 1, wherein the adsorbing agent has a crystallite size, measured at the rutile reflex, of more than 10 nm.

8. A method according to claim 1, wherein the intensity ratio of the two main reflexes for anatase and rutile [(101)-reflection line of anatase (at approximately 25.28° 2theta) and the (110)-reflection line of rutile (at approximately 27.45° 2theta)] is <1.

9. A method according to claim 1, wherein the adsorbing agent contains 10 to 80% by weight of titanium dioxide.

10. A method according to claim 1, wherein the adsorbing agent contains at least 50% by weight of decomposition residue.

11. A method according to claim 1, wherein the adsorbing agent contains at least 20% by weight of decomposition residue together with at least one further adsorbing agent, preferably finely divided titanium dioxide with a TiO$_2$ content of more than 80% by weight and with a BET surface area of more than 40 m$^2$/g.

12. A method according to claim 1, wherein the decomposition residue is used in the form of a filter cake.

13. A method according to claim 1, wherein the adsorbing agent is used together with an iron oxide-bearing material.

14. A method according to claim 1, wherein the adsorbing agent is used at a pH-value of <5.5.

15. A method according to claim 1, wherein the mass ratio of the adsorbing agent to the inorganic and/or organic compound to be adsorbed is from 10 to 10000.

16. A method of removing pollutants and/or toxic substances from a fluid, comprising:
   bringing the fluid into contact with an adsorbing agent, wherein the adsorbing agent comprises a decomposition residue which occurs as an insoluble residue in the production of titanium dioxide using the sulphate method and which comprises titanium and iron compounds, and removing pollutants and/or toxic substances from the fluid.

17. A method according to claim 16, wherein the pollutants and/or toxic substances are phosphates or compounds containing arsenic, antimony, sulphur, selenium, tellurium, cyano or heavy metal.

18. A method according to claim 16, wherein the fluid is a waste gas, waste water or sewage or ground water.

19. A method according to claim 16, wherein the fluid is the starting substance for fluid catalytic cracking.

20. A method according to claim 19, wherein the adsorbing agent is added directly to a reaction mixture or as a catalyst component to a catalyst.

21. A method of producing an adsorbing agent which contains titanium and iron compounds, wherein the method comprises:
   (i) decomposing a titanium- and iron-bearing starting material, with sulphuric acid to obtain a solids-bearing decomposition solution,
   (ii) separating off the solids contained in the decomposition solution to obtain a decomposition residue and a substantially solids-free decomposition solution,
   (iii) adding compounds containing iron ions to the decomposition residue,
   (iv) completely or partially neutralising the decomposition residue,
   (v) optionally washing the neutralised decomposition residue for the removal of sulphate salts, and
   (vi) optionally drying and/or granulating the decomposition residue to obtain an adsorbing agent.

22. A method according to claim 21, wherein iron salts are added in a dissolved form of iron(II)sulphate and/or iron(III) sulphate.

23. An adsorbing agent obtained by the method according to claim 21.

24. A composition, comprising:
   decomposition residue which occurs as an insoluble residue in the production of titanium dioxide using the sulphate method and which contains titanium and iron compounds, and neutralisation products of iron ions,
   wherein upon suspension of the composition in ten times the amount of a 30% sulphuric acid after agitation for one hour and then separation of the undissolved constituents in the fluid phase the iron concentration is more than 0.05% by weight and the mass ratio of Fe/Ti in the fluid phase is >0.8.

25. An apparatus comprising:
   a carrier; and
   a composition according to claim 24 fixed on said carrier.

26. An apparatus comprising:
   a container; and
   a composition according to claim 24 enclosed in said container.

* * * * *